United States Patent [19]
Owens

[11] 4,170,146
[45] Oct. 9, 1979

[54] MECHANISM FOR TRANSFORMING ROTARY MOTION TO LINEAR MOTION ADAPTED FOR DRIVING A MAGNETIC HEAD

[75] Inventor: William M. Owens, La Palma, Calif.

[73] Assignee: Micro Peripherals, Inc., Woodland Hills, Calif.

[21] Appl. No.: 825,524

[22] Filed: Aug. 18, 1977

[51] Int. Cl.² ............................................. F16H 27/02
[52] U.S. Cl. .................................................. 74/89.2
[58] Field of Search .................... 74/89.2, 89.21, 89.22

[56] References Cited
U.S. PATENT DOCUMENTS

| | | |
|---|---|---|
| 3,388,604 | 6/1968 | MacFarland et al. ................. 74/89.2 |
| 3,546,955 | 12/1970 | Winter et al. .......................... 74/89.2 |
| 3,614,898 | 10/1971 | Paine ..................................... 74/89.2 |
| 3,643,049 | 2/1972 | Luconic et al. ....................... 74/89.2 |
| 3,699,819 | 10/1972 | Mermelstein ........................ 74/89.22 |

Primary Examiner—Carroll B. Dority, Jr.
Assistant Examiner—Wesley S. Ratliff, Jr.
Attorney, Agent, or Firm—Albert M. Herzig; Edward C. Walsh

[57] ABSTRACT

A device or mechanism which converts rotary motion into linear motion. The mechanism is well adapted for converting rotary movement of a pulley which is driven by a stepper motor responsive to signals from a computer into linear motion of a magnetic head. The magnetic head is mounted on guides for linear movement with respect to a record. A flexible metal band is wrapped around and attached to the driven pulley, the ends of the band extending tangent to the pulley and parallel to each other, the ends being secured to the block or carriage carrying the magnetic head. Angular movement of the pulley tends to unwrap one end portion of the band and to wrap the other portion thereby moving the block carrying the head linearly.

4 Claims, 7 Drawing Figures

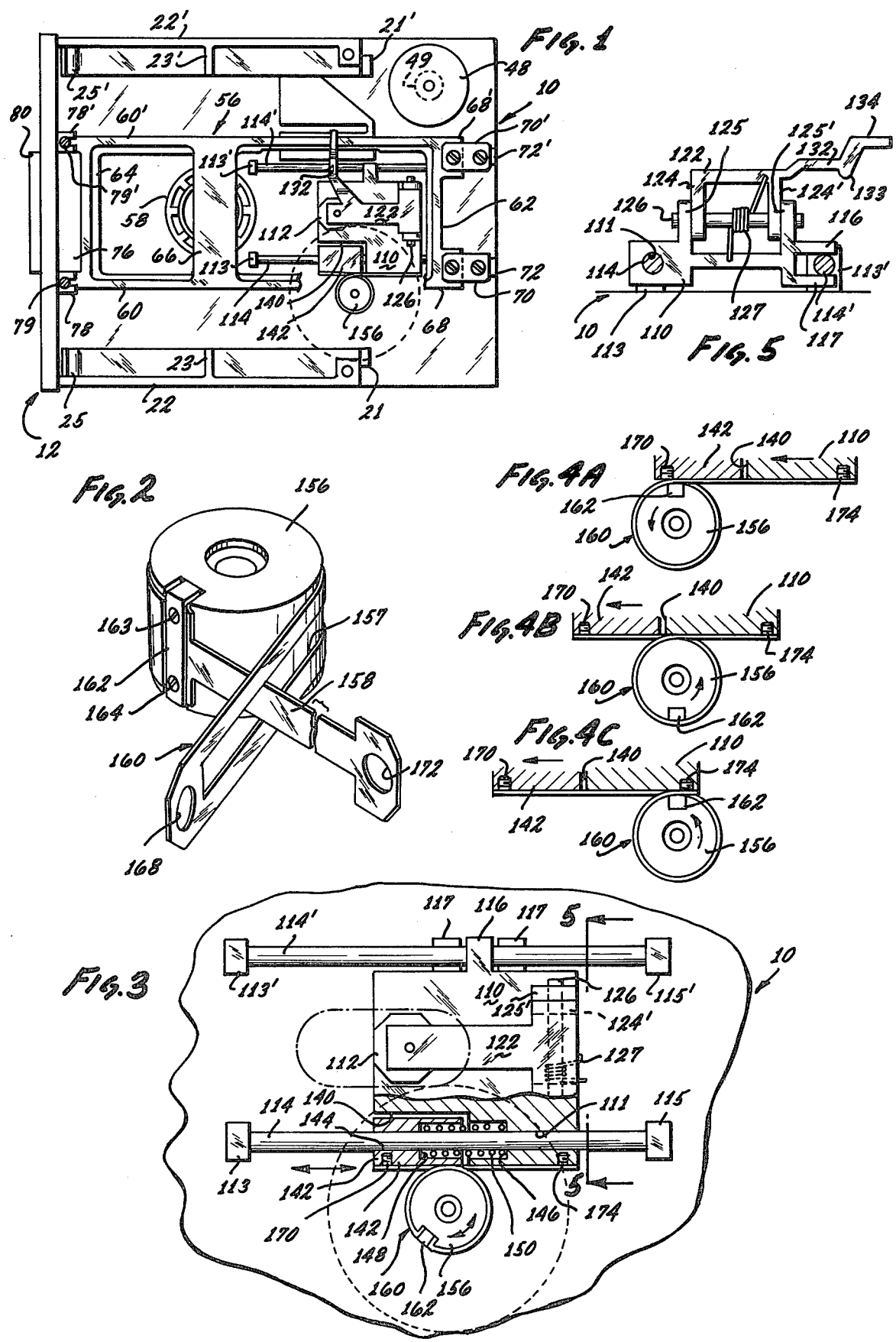

MECHANISM FOR TRANSFORMING ROTARY MOTION TO LINEAR MOTION ADAPTED FOR DRIVING A MAGNETIC HEAD

BACKGROUND OF THE INVENTION

1. Field of the Invention

In its broadest sense, the field of the invention is that of mechanisms for converting rotary or angular motion into linear motion. A particular and unique adaptation of the invention is that of converting the angular motion of a pulley driven by a stepper motor into linear motion of a magnetic head which cooperates with sound tracks on a magnetic record.

2. Description of the Prior Art

Various mechanism are known to the prior art wherein a rotary motion is converted into a linear motion which may be a reciprocating motion. For example, a mechanism such as a windlass is a known device, this being a device wherein a cable is wrapped on a drum and rotation of the drum can exert a pull on the cable. Such mechanisms as far as known, however, are not relevant to the particular unique mechanism of the herein invention, nor do they have the capability of being adapted to utilizations such as that described herein wherein the mechanism is adapted to the linear movement of a magnetic head. In known constructions using lead screws and the like for adjusting the head, there are imperfections in the lead screws so that there is a tolerance build-up from track to track. With respect to recording devices using records with multiple sound tracks and associated with magnetic pick-up or recording heads, such assemblies are, of course, known to the art. The mechanism for imparting a motion to a magnetic head as described in detail hereinafter is unique.

SUMMARY OF THE INVENTION

A preferred exemplary form of the invention is described in detail herein, the invention in the exemplary embodiment being utilized for purposes of driving, or that is, moving linearly, a magnetic head with respect to a disc record. Typically, records of this type may be flexible and may have a plurality of sound tracks which may be, for example, forty in number, or in other instances there may be seventy-eight tracks on a bigger record. The magnetic recording or pick-up head typically is movable along a diameter of the record from one track to another. Conventionally also, the movement of the magnetic head is in response to angular movements of the stepper motor. The magnetic head is driven or moved linearly in response to angular movements of the stepper motor, signals typically being derived from a computer.

The herein invention provides a unique mechanism for converting angular movements of a pulley driven by the stepper motor into linear movements of a block member or carriage carrying the magnetic head relative to the record. A stainless steel band is wrapped around the pulley with its ends coming off the pulley tangentially and aligned with each other, one end of the band having a slot in it through which the other end of it passes. The ends of the band are attached to the block or carriage carrying the head that moves linearly, the block having relatively movable parts biased apart by a spring to which parts the ends of the bands are secured. Thus, the band is held in tension and angular movements of the pulley are faithfully transmitted to the block as linear motion.

In light of the foregoing, the primary object of the invention is to realize an improved and simplified but very effective mechanism for converting angular motion into linear motion.

A further object is to realize a mechanism as in the foregoing which is extremely well adapted to the drive of a magnetic pick-up or recording head, the mechanism having the characteristics that it is simple, efficient, is frictionless and is immune to tolerance build-up in movements between tracks.

A further object is to realize a mechanism which will cause angular stepping movements of a stepping motor to be transmitted to the head carriage as linear movements with extreme precision.

Further objects and additional advantages of the invention will become apparent from the following detailed description and annexed drawings.

BRIEF DESCRIPTION OF THE DRAWINGS

FIG. 1 is a schematic view of a unit having drive mechanism for a record and for moving a magnetic head, the mechanism of the invention being embodied therein;

FIG. 2 is a perspective view of a preferred form of the motion converting mechanism of the invention;

FIG. 3 is an enlarged view of the magnetic head carriage of FIG. 1 showing the drive mechanism of the invention;

FIGS. 4A, 4B and 4C are detailed views illustrating the action or operation of the mechanism of the invention;

FIG. 5 is a view taken along the line 5—5 of FIG. 3.

DESCRIPTION OF THE PREFERRED EMBODIMENT

FIG. 1 shows the unit having a frame whereby the unit may be incorporated into or associated with a computer.

Numeral 10 designates a rectilinear base frame which can be made of aluminum or the like. At the front of the unit is a front panel 12 attached to the base frame, the front panel preferably being made from material such as plastic or the like.

There are two side panels which preferably are made of plastic material or the like which are upstandanding from the top surface of the base member 10 as designated at 22 and 22'. The front edges of these side members are secured to the front panel 12, being attached to an inwardly extending flange at the side edges of the front panel 12. The side members are also secured to posts 21 and 21' upstanding from base 10.

On the inside of the members 22 and 22' are vertical strengthening ribs 23 and 23' and the side members are provided with inwardly extending longitudinal ribs which form a slide channel between them. At the entrance edge of this slide channel the ends of the longitudinal ribs diverge as may be seen at 25 and 25' to accommodate the entrance of the edge of the record between them.

It will be understood that the guide members on the inside of the side member 22 and 22' provide a guideway so as to guide a record into position in the unit. The record may be a flexible record known in the trade as a "Diskette." The record itself is round, having a center opening and preferably is in a rectangular jacket or container, the jacket or container having an opening in it which is positioned to accommodate the recording or pick-up head. As previously described, the record is of a type that may have, for example, forty circular tracks with information on the record in the form of bits, that is, digital information.

Carried on the base 10 is a drive motor 48 for the record, the motor having a pulley 49 which drives a larger pulley by way of a belt. The driver pulley is on the shaft of a hub which, as will be described, is engageable with a clutch 58 which engages the record for driving it. Parts as just described are within the base 10 below its top.

Numeral 56 designates a generally rectangular frame member which carries the circular drive clutch 58 that causes the record to be driven, as will be described. The frame 56 may preferably be made from a light material, such as aluminum. It has side members 60 and 60', an end member 62, a transverse end member 64, and an intermediate transverse member 66. The end member 62 has extensions 68 and 68'. Numerals 70 and 70' designate a pair of leaf springs attached to the extensions 68 and 68', and also to supporting posts 72 and 72' upstanding from the top surface of the base 10.

Attached to the front end of the frame member 56 is a panel or door 76 having inwardly extending brackets 78 and 78' which are secured to the ends of the frame 56 by screws 79 and 79' as may be seen in FIG. 1. The panel 76 has an outwardly extending finger piece 80 which extends outwardly through a recess in the front panel 12 to be accessible to be operated by the fingers of the operator. Preferably a latching shoulder for latching door 76 in closed or down position is provided.

FIGS. 1, 3 and 5 illustrate the adjustable pick-up head that cooperates with the record and the means whereby pressure is applied to the record and means for loading the record positioned over the head. Numeral 110 designates a plastic sliding block which carries the recording or pick-up head 112. The block 110 is mounted to be movable in a direction along a diameter with respect to the record. Numeral 114 and 114' designate guide rods carried by posts 113-113' and 115-115' upstanding from the top of the base 10, the block 110 being slidable with respect to these guide rods. At one side of the block 110 there is a bore 111 extending through it through which the guide rod 114 extends. At the other side of the block 110 as extending projections 116 and 117 which fit on opposite sides of the guide rod 114' as may be seen in FIG. 5. When the record is in the unit, it moves into a position for the pick-up head 112 to engage it.

Mounted on the block 110 is a head loading arm 122. The right end of this arm has legs 124 and 124' which are hinged on a hinge pin 126 mounted in posts 125 and 125' upstanding from the top surface of block 110. See FIG. 5. Arm 122 is biased by spring 127. At the left end of the head loading arm 122 is a felt pad that can come down into position over the pick-up head 112. Extending to one side of the head loading arm 122 is an auxiliary arm 132 which, as may be seen in FIG. 2, has a downwardly extending abutment 133 and an angular end piece 134. Means can be provided which are not part of the herein invention to cooperate with arm 132 to provide loading of the pick-up head.

It will be understood that the unit as described operates in conjunction with a computer receiving digital signal information from the computer or delivering such information to the computer. The computer delivers signals to a stepper motor which is mounted underneath the top surface of the base 10, the stepper motor being arranged to adjust the block 110 carrying the pick-up head relatively to the tracks on the record.

The magnetic head or block or carriage 110 is shown in greater detail in FIGS. 3 and 5 and the mechanism for converting angular movement to linear motion is shown in greater detail in FIGS. 2, 3, 4A, 4B and 4C. At one side of the carriage 110, it is provided with a rectilinear cutout as designated at 140. Fitting in this cutout is a block 142 which has a bore 144 through which the stem 114 passes, this bore being aligned with the previously described bore 111. In the block 110 is a counterbore 146 and in the block 142 is an aligned counterbore 148. Positioned in the counterbores is a coil spring 150 the ends of which seat in the bottoms of the counterbores.

Numeral 156 identifies the pulley which is mounted on a shaft of the stepper motor which is within the base 10. The mechanism for converting angular movements of the pulley 156 into linear movements of the carriage 110 includes a thin flexible band as designated at 160 that may be made from stainless steel and may have a thickness of 0.002 inches. The pulley 156 by way of example, could have a diameter of 0.6336 inches. One end of the band has a slot in it as designated at 157. The other end part 158 of the band is narrowed and passes through the slot 157, the band being wrapped around the pulley 156 as shown. The band is attached to the pulley by way of a metal bracket 162 and flat head screws 163 and 164. The two ends of the band are brought off the pulley 180° to each other tangentially, so that the ends are aligned as illustrated in FIGS. 3, 4A, 4B and 4C.

The end of the band having the slot in it has an opening 168 and it is secured to the block 142 by way of a screw 170. The other end 158 of the band has opening 172 in it and it is secured to the block 110 by a screw 174.

As may be seen in FIG. 3, the spring 150 exerts outward forces on the block 142 and the block 110 pushing them apart, and producing tension in the band 160 so that it is kept taut. As may be seen, angular stepping movements of the pulley 156 cause one end of the band to unwrap while the other end wraps with corresponding linear movement being imparted to the block 110 while the tension is maintained. FIGS. 4A, 4B and 4C illustrate angular or rotary movements of the pulley 156 and corresponding linear movement of the block 110 with the block 142. The flexible band drive or mechanism provides a more accurate step timing as compared to other modes of magnetic head stepping or movement. This is accomplished with virtually no friction from track to track and no tolerance build-up between tracks except that which may be present in the stepper motor itself. The contact between the carriage band and the pulley acts as a dampener for the stepper motor preventing hysteresis or other fluctuations. The attachment of the band to the pulley is such that better than 360° of angular movement of the pulley is allowed with corresponding linear movement of the head carriage.

The operation of the mechanism will be readily understood from the foregoing description and from the illustrative views, FIGS. 4A, 4B and 4C. The stepper motor operates in angular steps in response to signals from the computer and these angular movements are transformed into corresponding linear movements of the block 110 carrying the magnetic head 112.

From the foregoing, those skilled in the art will readily understand the nature and construction of the invention and the manner in which it achieves all of the objectives as set forth in the foregoing.

The foregoing disclosure is representative of a preferred form of the invention and is to be interpreted in an illustrative rather than a limiting sense, the invention to be accorded the full scope of the claims appended hereto.

What is claimed is:

1. In an apparatus including record means and record drive means, the record means having a plurality of tracks, megnetic head means movable relative to the said tracks, the head means being mounted for linear movement, the improvement including actuating means for imparting linear movement to the head means, the said actuating means including a stepper motor having an output rotor member, a flexible member having wrapped engagement with the said rotor member, an end part of said flexible member having attachment to the head means whereby angular movement of the said rotor imparts linear movement to the said head means, and resilient means having securement to the other end part of said flexible member and arranged to tension said member.

2. Apparatus as in claim 1 wherein one end part of the said flexible member has a longitudinal slot therein, the other end of said flexible member being narrowed and positioned to extend through the said slot.

3. Apparatus as in claim 1 wherein said magnetic head means includes a carriage block, guide means for the block including at least one guide member, a tension member separate from the said block positioned to be guided by said guide member and having one end of said flexible member secured to it, said resilient means being in the form of a spring having one end bearing against the said block member and the other end against said tension member.

4. A mechanism for converting rotary motion into linear motion comprising, in combination, a rotor mounted for angular movement, a flexible member which is at least partially wrapped around the said rotor and having at least a portion extending tangentially from the said rotor, means associated with said portion to ensure that it moves tangentially and linearly, whereby angular movements of said rotor impart proportional linear movement to said portion, said last means including a moveable block and guide means for the block, a second moveable block having said flexible member secured to it, said guide means including means for guiding the second block in alignment with said first block and resilient means urging said blocks apart.

* * * * *